United States Patent [19]

Matsumoto

[11] Patent Number: 5,195,296
[45] Date of Patent: Mar. 23, 1993

[54] WRAPPING METHOD

[76] Inventor: Ryozo Matsumoto, 239-9, Oaza-Tanaka, Sasaguri-machi, Kasuya-gun, Fukuoka-ken, Japan

[21] Appl. No.: 743,711

[22] Filed: Aug. 12, 1991

[51] Int. Cl.⁵ ............................................. B65B 11/04
[52] U.S. Cl. ........................................ 53/399; 53/441; 53/556; 53/587
[58] Field of Search ............... 53/399, 441, 556, 587, 53/588; 264/290.2

[56] References Cited

U.S. PATENT DOCUMENTS

| | | | |
|---|---|---|---|
| 2,597,041 | 5/1952 | Stokes | 53/556 X |
| 4,087,226 | 5/1978 | Mercer | 264/290.2 X |
| 4,116,892 | 9/1978 | Schwarz | 264/290.2 X |
| 4,368,565 | 1/1983 | Schwarz | 264/290.2 |
| 4,418,510 | 12/1983 | Lancaster | 53/587 X |
| 4,729,213 | 3/1988 | Raes | 53/587 X |
| 5,003,752 | 4/1991 | Matsumoto | 53/556 X |

FOREIGN PATENT DOCUMENTS

| | | | |
|---|---|---|---|
| 81328 | 6/1983 | European Pat. Off. | 53/556 |
| 343453 | 11/1989 | European Pat. Off. | 53/556 |

Primary Examiner—John Sipos
Attorney, Agent, or Firm—Cushman, Darby & Cushman

[57] ABSTRACT

A plastic film is simultaneously stretched laterally and longitudinally and wound around a load just after stretching thereof, thereby tightening the load in both the vertical direction and horizontal direction with the film.

2 Claims, 3 Drawing Sheets

WRAPPING METHOD

BACKGROUND OF THE INVENTION

1. Field of the Invention

The present invention relates to a method for wrapping a load with a plastic film while stretching the film both laterally and longitudinally.

2. Description of the Prior Art

Japanese Patent Publication sho 61-27254 discloses an apparatus for wrapping a film of the kind mentioned above. As shown in FIG. 4, this apparatus has a turntable (c) on which a load (d) is placed, a support post (e) carrying a roll of plastic film (f) and spaced by a predetermined distance from the turntable (c), and spaced-apart primary and secondary rollers (g) and (h) disposed between the turntable (c) and the support post (e). In operation, the film (f) is wound around the load (d) after passing through the primary and secondary rollers (g) and (h) while the turntable (c) and, hence, the load (d) on the turntable (c) are rotated. That is, the film (f) is stretched by the actions of the primary and secondary rollers (g) and (h) and subsequently, the load (d) is wrapped with the film (f) thus stretched.

The film formed as described above, however, has been stretched only in the longitudinal direction, so that the restoring force produced by elasticity of the film tightens the load only in the horizontal direction. In the case where the load consists of a stack of a multiplicity of small articles, it is impossible to tighten the stack vertically or in its stacking direction, thus allowing an easy collapse of the stack. This problem is serious particularly when the peripheral surface of the stack has unevenness along the vertical direction, since in such a case gaps are formed between the peripheral surface of the stack and the film so that the stack can not be sufficiently tightened only by the horizontal tightening force.

An object of the present invention is therefore to provide a wrapping method in which a wrapping plastic film can be stretched both laterally and longitudinally just before wrapping a load with the film, thereby tightening the load in both the vertical direction and horizontal direction with the film.

SUMMARY OF THE INVENTION

To this end, according to the present invention, there is provided a method for wrapping a load with a wrapping plastic film from its roll, by creating relative rotation between said roll of film and the load to extract said film from the roll of film onto the load, said method including the steps of preparing a pair of stretching rollers having vertical axes and disposed between said load and said roll of film, said stretching rollers having alternate substantially horizontal peripheral ridges and substantially horizontal peripheral grooves and being arranged so that the peripheral ridges on each stretching roller mesh with the peripheral grooves on the other stretching roller, passing said film extracted from said roll of film between said meshed stretching rollers, simultaneously stretching said film laterally and longitudinally by rotating said stretching rollers at different speeds, and wrapping said load with said stretched film just after stretching thereof, thereby tightening said load in both the vertical direction and horizontal direction with said film.

BRIEF DESCRIPTION OF THE DRAWINGS

The wrapping method according to the present invention will be described hereinafter in more detail with reference to the accompanying drawings in which.

DETAILED DESCRIPTION OF THE PRESENTLY PREFERRED EMBODIMENTS

Figure 1:
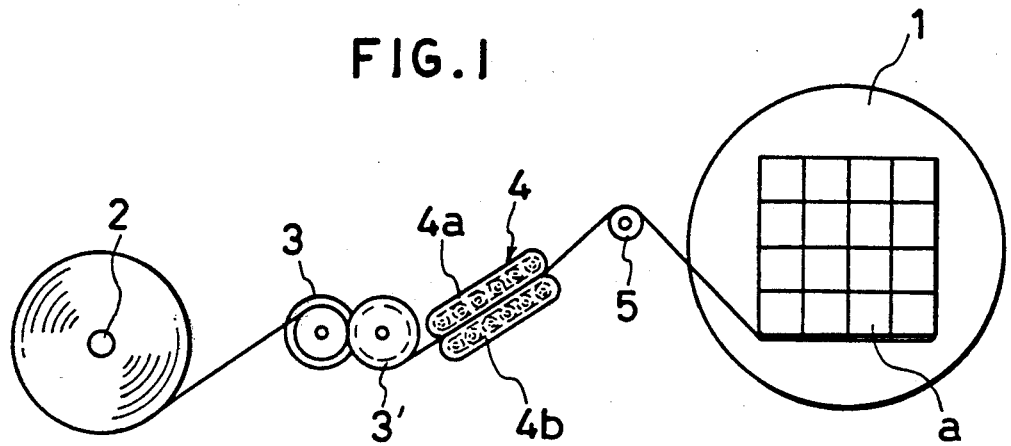
FIG. 1 is a schematic illustration of the whole construction of an apparatus for carrying out the wrapping method according present invention.

Referring to FIG. 1, the apparatus has a turntable 1 on which a load (a) to be wrapped is placed. A support post 2 carrying a roll of stretchable plastic film (b) is spaced by a predetermined distance from the turntable 1. A pair of opposed stretching rollers 3, 3' with vertical shafts are disposed between the turntable 1 and the support post 2. A pair of spreaders 4, 4' are disposed between the stretching rollers 3, 3' and the turntable 1, and an idler 5 between the spreaders 4, 4' and the turntable 1.

Figure 2:
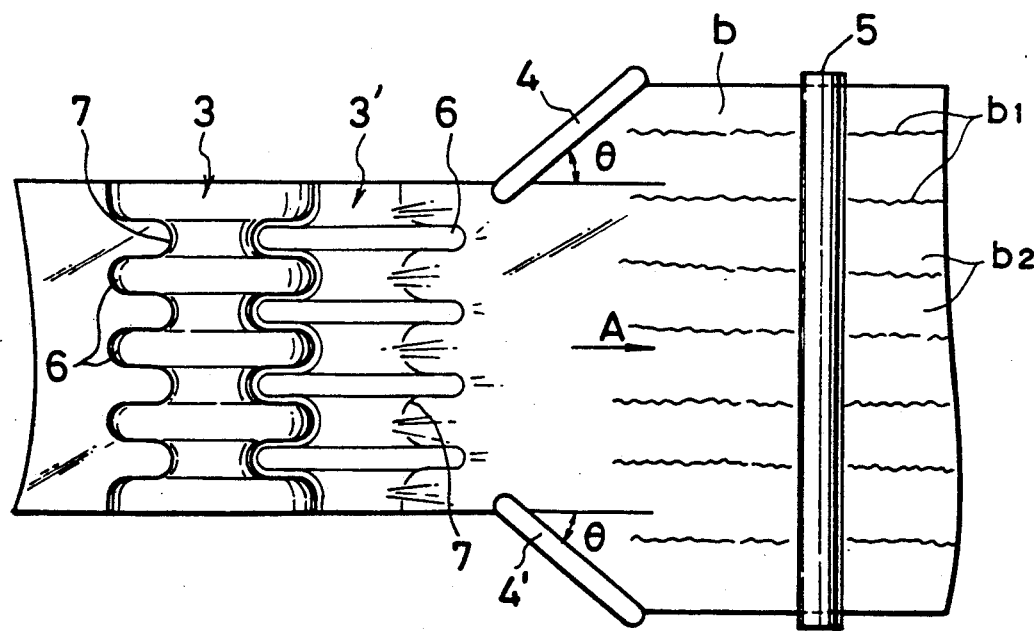
FIG. 2 is a illustration of critical portions of the apparatus shown in FIG. 1 and of a wrapping film stretched by the apparatus.

As shown in FIG. 2, ridges 6 and grooves 7 are alternately formed on the outer peripheral surface of each of the stretching rollers 3, 3' so that the ridges 6 on one of the stretching rollers 3, 3' mesh with the grooves 7 on the other stretching roller. In addition, the stretching rollers 3, 3' are rotatively driven in opposite direction so that the peripheral speed of the downstream roller 3' is greater than that of the upstream roller 3.

Consequently, the film (b) passing between the stretching rollers 3, 3' is forcibly stretched both laterally and longitudinally of the film (b) by the actions of the intermeshed ridges 6 and grooves 7. Namely, the film (b) which is delivered from the stretching rollers 3, 3' has been uniformly longitudinally stretched due to the fact that the downstream roller 3' rotates at a greater peripheral speed. In addition, the film (b) has not been substantially laterally stretched in the regions where the ridges 6 and the grooves 7 mesh with each other but has been stretched in conformity with the profiles of the ridges 6 and grooves 7 in Other regions. Consequently, the film (b) thus stretched has alternately in the lateral direction non-stretched portions ($b_1$) which correspond to the regions where the ridges 6 and the grooves 7 mesh with each other, and stretched portions ($b_2$) corresponding to other regions, as shown in FIG. 2.

The stretched film (b) is grasped at both its lateral edges by the spreaders 4, 4' so as to be laterally spread at an angle $\theta$. The angle $\theta$ is determined so that the distance between the pair of spreaders 4, 4' equals the breadth of the film (b) after stretching thereof performed laterally by the stretching roller 3, 3'. In consequence, the angle $\theta$ can be controlled by suitably selecting the numbers and configurations of the ridges 6 and grooves 7 of the stretching rollers 3, 3'.

The spreaders 4, 4' are so arranged as to operate at a film delivery speed in conformity with the speed at which the film (b) coming out the downstream roll 3' runs in the direction of an arrow A. Representing the running speed of the film (b) in the direction of the arrow A by V, the speed of the spreaders 4, 4' is given by V/cosθ.

Figure 3:
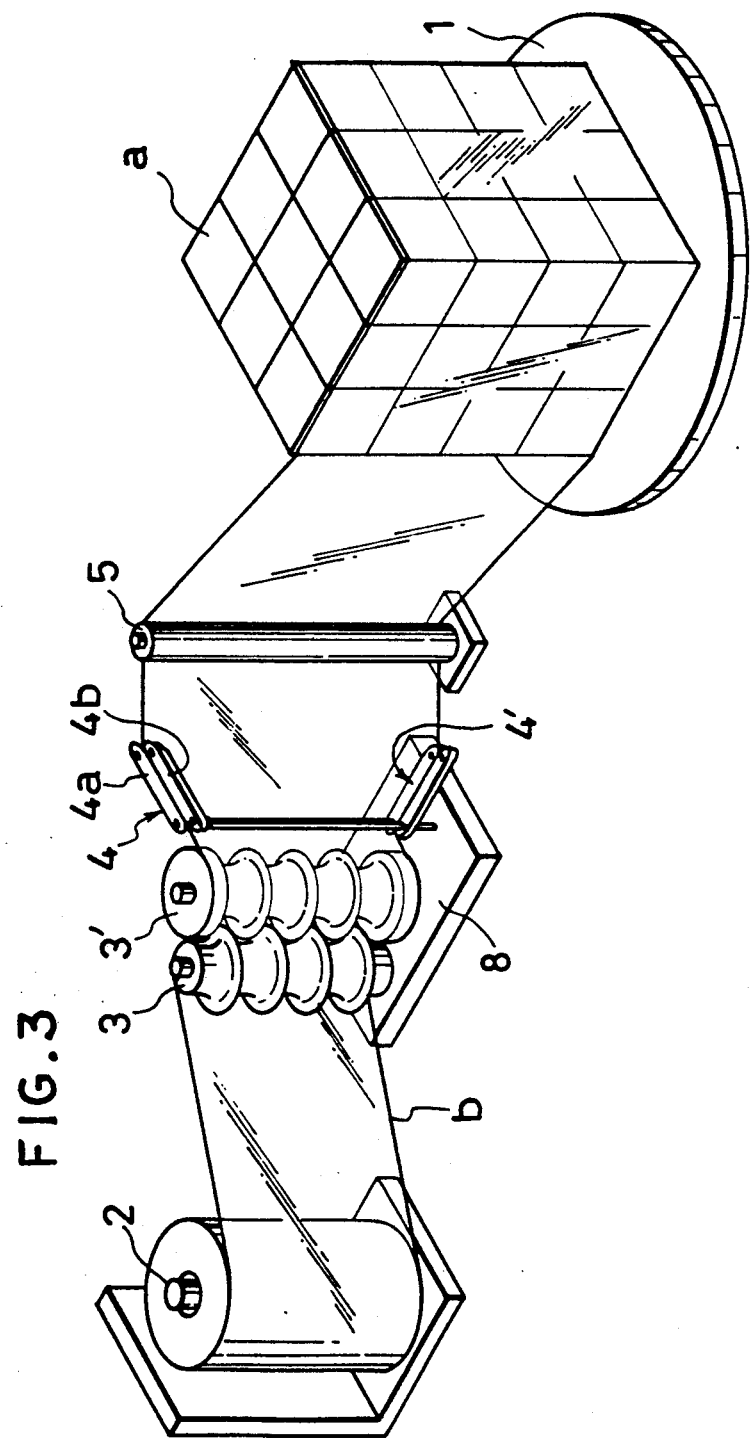
FIG. 3 is a perspective view of an apparatus incorporating the constituents shown in FIG. 1 and of a wrapping film stretched by the apparatus.
Figure 4:
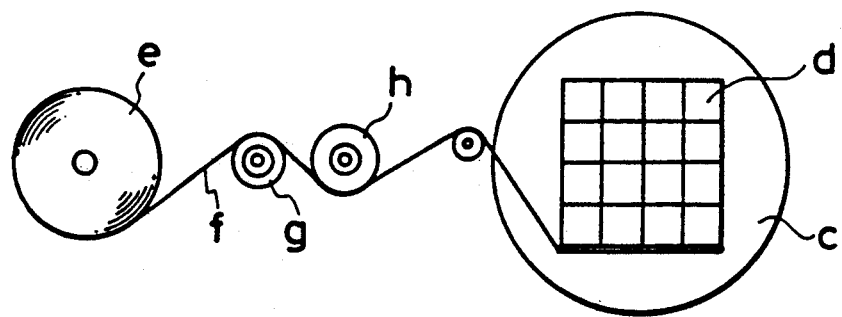
FIG. 4 is a illustration of a conventional wrapping apparatus.

Each of the spreaders 4, 4' may be of a suitable mechanism which can optimize the feeding of the film (b) to the load (a) to be wrapped, such as an endless-belt type mechanism as shown in FIGS. 1 to 3, a feeding mechanism using rollers and the like.

The film (b) spread by the spreader 4, 4' into a predetermined breadth is then wound through the idler 5 around the load (a) on the turntable 1.

In this manner, the film (b) has been stretched both laterally and longitudinally just before it is wound around the load (a). Consequently, a longitudinal restoring force of the film (b) can be exerted on the load (a) as a force tightening the load (a) in the horizontal direction, in the same way as the known method. In addition, since the film (b) has been stretched also in the lateral direction, its lateral restoring force can be exerted on the load (a) as a vertical tightening force, in contrast to the known method. When the load consists of a stack of a multiplicity of small articles, the stack can be tightened not only in the horizontal direction but also in the stacking direction, thereby preventing collapse of the stack. In particular, because the film (b) contracts also in the stacking direction during its restoring contraction, in the case where the peripheral surface of the stack has vertical unevenness, the film (b) can deform along the peripheral configuration of the stack so that the gap between the film (b) and the peripheral surface of the stack is minimized to further ensure prevention of collapse of the stack. Since the magnitude of the tightening force and the degree of contraction in the lateral direction obtained the film (b) during its restoring contraction are determined by the degree of stretching of the film (b), they can be set to optimum values by suitably selecting the numbers and configurations of the ridges 6 and grooves 7 on the stretching rollers 3, 3'. In the wrapping method according to the present invention, the film can be stretched laterally up to about 3 times the original breadth thereof, so that a container of 1200 mm high which is the most typical as a load can be wrapped by one winding of a film unwound from a roll of film of 500 mm breadth.

FIG. 3 illustrates an apparatus having the constituents explained above for wrapping a load with a plastic film in accordance with the method of the present invention. The roll of film (b) is held on the support post 2 and the film (b) is pinched between the stretching rollers 3, 3' which are rotatively driven by means of drive units 8 including electric motors(not shown).

Rotation speeds of the stretching rollers 3, 3' are adapted to be independently controllable. Therefore, as shown in FIG. 2, the film (b) is stretched uniformly in the longitudinal direction and in a corrugated form in the lateral direction by the actions the intermeshed ridges 6 and grooves 7. The film (b) thus stretched is spread into a predetermined breadth by the spreaders 4, 4' which grasp the film (b) at both its lateral edges. The film (b) is then wound through the idler 5 around the load (a) on the turntable 1 which is rotated at a peripheral speed greater than the speed of the film (b) delivered from the spreaders 4, 4'.

As has been described, according to the present invention, a wrapping film is simultaneously stretched laterally and longitudinally and it is wrapped around a load just after stretching thereof so that the load can be tightened in both the vertical direction and horizontal direction with the film. It is therefore possible to prevent collapse of the load even when it consists of a stack of multiplicity of small articles.

I claim:

1. A method for wrapping a load with a plastic film from its roll, by creating relative rotation between said roll of film and the load to extract said film from said roll of film onto the load, said method comprising the steps of:

providing a pair of stretching rollers having vertical axes and being disposed between said load and said roll of film, said stretching rollers having alternate substantially horizontal peripheral ridges and substantially horizontal peripheral grooves and being arranged so that the peripheral ridges on each stretching roll mesh with the peripheral grooves of the other stretching roll;

passing said film extracted from said roll of film between said meshed stretching rolls;

uniformly stretching said film longitudinally while non-uniformly stretching said film laterally so as to form alternately stretched and unstretched portions in the lateral direction of said film, by rotating said stretching rollers at different speeds; and wrapping said load with said stretched film just after stretching thereof, thereby tightening said load with said film in both vertical and horizontal directions.

2. A method as claimed in claim 1, wherein said unstretched portions correspond to regions where said grooves mesh with said ridges.

* * * * *